(12) United States Patent
Miyahara et al.

(10) Patent No.: US 10,994,247 B2
(45) Date of Patent: May 4, 2021

(54) ZEOLITE MEMBRANE COMPOSITE AND PROCESS FOR PRODUCING ZEOLITE MEMBRANE COMPOSITE

(71) Applicant: NGK INSULATORS, LTD., Nagoya (JP)

(72) Inventors: Makoto Miyahara, Nagoya (JP); Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/568,689

(22) Filed: Sep. 12, 2019

(65) Prior Publication Data

US 2020/0001250 A1    Jan. 2, 2020

Related U.S. Application Data

(63) Continuation of application No. PCT/JP2018/008312, filed on Mar. 5, 2018.

(30) Foreign Application Priority Data

| Mar. 31, 2017 | (JP) | JP2017-071540 |
| Mar. 31, 2017 | (JP) | JP2017-071566 |
| Mar. 31, 2017 | (JP) | JP2017-071567 |
| Jun. 7, 2017 | (JP) | JP2017-112634 |

(51) Int. Cl.

| *B01J 29/06* | (2006.01) |
| *B01D 71/02* | (2006.01) |
| *B01D 67/00* | (2006.01) |
| *B01D 69/10* | (2006.01) |
| *B01D 69/12* | (2006.01) |
| *C01B 39/48* | (2006.01) |
| *B01J 20/28* | (2006.01) |
| *B01J 20/18* | (2006.01) |
| *B01J 20/32* | (2006.01) |
| *B01J 37/03* | (2006.01) |
| *B01J 29/08* | (2006.01) |
| *B01J 29/70* | (2006.01) |
| *B01J 29/80* | (2006.01) |
| *B01J 37/02* | (2006.01) |
| *B01J 35/00* | (2006.01) |
| *B01J 35/06* | (2006.01) |
| *C01B 39/20* | (2006.01) |
| *C01B 39/46* | (2006.01) |

(52) U.S. Cl.
CPC ....... *B01D 71/028* (2013.01); *B01D 67/0051* (2013.01); *B01D 69/10* (2013.01); *B01D 69/12* (2013.01); *B01D 71/024* (2013.01); *B01J 20/18* (2013.01); *B01J 20/28033* (2013.01); *B01J 20/28035* (2013.01); *B01J 20/32* (2013.01); *B01J 20/3238* (2013.01); *B01J 29/082* (2013.01); *B01J 29/084* (2013.01); *B01J 29/70* (2013.01); *B01J 29/80* (2013.01); *B01J 35/0006* (2013.01); *B01J 35/065* (2013.01); *B01J 37/0228* (2013.01); *B01J 37/035* (2013.01); *C01B 39/48* (2013.01); *B01D 2323/24* (2013.01); *B01J 2029/062* (2013.01); *B01J 2229/60* (2013.01); *B01J 2229/62* (2013.01); *B01J 2229/64* (2013.01); *C01B 39/205* (2013.01); *C01B 39/46* (2013.01)

(58) Field of Classification Search
CPC ...... B01D 69/12; B01D 69/125; B01D 69/10; B01D 67/0051; B01D 71/028; B01D 2323/24; B01D 2323/18; B01D 2323/40; B01J 37/035; B01J 20/18; B01J 20/28033; B01J 20/28035; B01J 20/32; B01J 20/3238; B01J 2029/062; B01J 29/082; B01J 29/084; B01J 29/70; B01J 29/80; B01J 2229/60; B01J 2229/62; B01J 2229/64; B01J 35/0006; B01J 35/065; B01J 37/0228; C01B 39/48; C01B 39/46; C01B 39/205
USPC .. 502/4, 60, 67, 69, 64, 400, 407, 414, 415, 502/526, 527.15, 527.12; 423/702, 709, 423/716

See application file for complete search history.

(56) References Cited

U.S. PATENT DOCUMENTS

| 5,194,235 A | 3/1993 | Zones |
| 2014/0360938 A1 | 12/2014 | Hayashi et al. |
| 2016/0137518 A1 | 5/2016 | Rivas-Cardona et al. |
| 2017/0036175 A1 | 2/2017 | Tanabe et al. |

(Continued)

FOREIGN PATENT DOCUMENTS

| JP | 2016-147801 A1 | 8/2016 |
| JP | 2016-169139 A1 | 9/2016 |

(Continued)

OTHER PUBLICATIONS

Jiaying Li, et a,, "Synthesis of NH3-SCR Catalyst SAPO-56 with Different Aluminum Sources," *Procedia Engineering*, 121 (2015), pp. 967-974.

(Continued)

*Primary Examiner* — Elizabeth D Wood
(74) *Attorney, Agent, or Firm* — Burr & Brown, PLLC

(57) ABSTRACT

A process for producing a zeolite membrane composite includes a step of obtaining FAU-type seed crystals, a step of depositing the FAU-type seed crystals on a support, a step of forming an AFX-type zeolite membrane on the support by immersing the support in a raw material solution and growing an AFX-type zeolite from the FAU-type seed crystals by hydrothermal synthesis, and a step of removing a structure-directing agent from the AFX-type zeolite membrane. In this way, the AFX-type zeolite membrane can be provided.

11 Claims, 3 Drawing Sheets

(56) References Cited

U.S. PATENT DOCUMENTS

| | | | |
|---|---|---|---|
| 2017/0225130 A1* | 8/2017 | Noda | B01D 69/12 |
| 2017/0291135 A1 | 10/2017 | Noda | |
| 2017/0296893 A1 | 10/2017 | Noda | |
| 2017/0296980 A1* | 10/2017 | Noda | B01J 20/3265 |
| 2017/0348679 A1 | 12/2017 | Naraki | |
| 2019/0292062 A1* | 9/2019 | Yoshimura | B01D 53/228 |

FOREIGN PATENT DOCUMENTS

| | | |
|---|---|---|
| JP | 2016-204245 A1 | 12/2016 |
| WO | 2012/046545 A1 | 4/2012 |
| WO | 2013/125660 A1 | 8/2013 |
| WO | 2015/159986 A1 | 10/2015 |
| WO | 2016/121887 A1 | 8/2016 |
| WO | 2016/121888 A1 | 8/2016 |
| WO | 2016/121889 A1 | 8/2016 |

OTHER PUBLICATIONS

M. Vilaseca, et al., "AlPO$_4$-18 Synthesized from Colloidal Precursors and its Use for the Preparation of Thin Films," *Applied Surface Science*, 226 (2004), pp. 1-6.

Tadafumi Yamamura, et al., "Development of Membrane Aided Reactor," *Mitsui Zosen Technical Review*, No. 178 (2003-2), pp. 115-120.

Ying Cui, et al., "Zeolite T Membrane: Preparation, Characterization, Pervaporation of Water/Organic Liquid Mixtures and Acid Stability," *Journal of Membrane Science*, 236 (2004), pp. 17-27.

Emi Mitai et al., "Improving Functionality of AFX Zeolites by Hydrothermal Conversion of FAU Zeolites," *119th Catalyst Forum Lecture Proceedings*, Mar. 10, 2017, p. 188 (with English tranlsation).

International Search Report and Written Opinion (Application No. PCT/JP2018/008312) dated Apr. 24, 2018.

International Preliminary Report on Patentability (Application No. PCT/JP2018/008312) dated Oct. 10, 2019 (with English translation).

* cited by examiner

ZEOLITE MEMBRANE COMPOSITE AND PROCESS FOR PRODUCING ZEOLITE MEMBRANE COMPOSITE The present application is a continuation application of International Application No. PCT/JP2018/008312, filed Mar. 5, 2018, which claims priority to Japanese Patent Application No. 2017-071540, filed Mar. 31, 2017, Japanese Patent Application No. 2017-071566, filed Mar. 31, 2017, Japanese Patent Application No. 2017-071567, filed Mar. 31, 2017, and Japanese Patent Application No. 2017-112634, filed Jun. 7, 2017. The contents of these applications are incorporated herein by reference in their entirety.

TECHNICAL FIELD

The present invention relates to a zeolite membrane composite obtained by forming a zeolite membrane on a support.

BACKGROUND ART

Various studies and developments are currently underway on forming an aluminosilicate zeolite membrane on a support so as to obtain a zeolite membrane composite and using the zeolite membrane composite in applications using zeolites, such as specific gas separation or molecular adsorption. As the zeolite membrane, a membrane formed of a DDR-, LTA-, FAU-, MFI-, or CHA-type zeolite is known.

For example, International Publication WO/2012/046545 (Document 1) discloses a technique for forming an FAU-type zeolite membrane on a surface of a porous alumina tube and converting part of a surface of the FAU-type zeolite membrane into a CHA-type zeolite membrane by hydrothermal synthesis. International Publication WO/2015/159986 (Document 2) discloses a technique for depositing an FAU-type zeolite as seed crystals on a porous support and conducting hydrothermal synthesis so as to form a CHA-type zeolite membrane on the support.

Meanwhile, the specification of U.S. Pat. No. 5,194,235 (Document 3) discloses a process for producing AFX-type zeolite (SSZ-16) powder by using Y-type zeolite powder as a raw material.

Incidentally, there are no case reports that indicate success in making AFX-type aluminosilicate zeolites in the form of a membrane. Thus, the development of practicable AFX-type zeolite membranes is expected. The production process disclosed in Document 3 relates to AFX-type zeolite powder and is not suited for the production of AFX-type zeolite membranes. If the production method according to Document 3 is used to produce a zeolite membrane on a surface of a support, hydrothermal synthesis is conducted by immersing the support in a synthetic sol containing Y-type zeolite powder. However, because the Y-type zeolite powder is apt to settle out on the bottom of a container that retains the synthetic sol, it is difficult to suitably produce a zeolite membrane.

SUMMARY OF INVENTION

The present invention has been made in light of the problem described above, and it is an object of the present invention to provide an AFX-type zeolite membrane.

A zeolite membrane composite according to one preferable embodiment of the present invention includes a support and an AFX type zeolite membrane formed on the support. According to the present invention, an AFX-type zeolite membrane can be provided.

Preferably, the AFX type zeolite membrane may be a zeolite membrane made of aluminosilicate zeolite.

Preferably, the AFX type zeolite membrane may be in direct contact with the support.

Preferably, the zeolite membrane composite may further include an FAU type zeolite membrane located between the support and the AFX type zeolite membrane.

More preferably, the FAU type zeolite membrane may be a Y- or X-type zeolite membrane.

Preferably, the support may be porous.

Preferably, the support may be a sintered alumina compact, a sintered mullite compact, or a sintered titania compact.

The present invention is also intended for a process for producing a zeolite membrane composite. The process for producing a zeolite membrane composite according to one preferable embodiment of the present invention includes a) obtaining an FAU type seed crystal, b) depositing the FAU type seed crystal on a support, c) forming an AFX type zeolite membrane on the support by immersing the support in a raw material solution and growing an AFX type zeolite from the FAU type seed crystal by hydrothermal synthesis, and d) removing a structure-directing agent from the AFX type zeolite membrane. According to the present invention, an AFX-type zeolite membrane can be provided.

Preferably, the process for producing a zeolite membrane composite may further include, between the operations b) and c), making the FAU type seed crystal on the support in the form of a membrane by hydrothermal synthesis.

More preferably, when the operation c) has been completed, an FAU type zeolite membrane may be present between the support and the AFX type zeolite membrane.

Preferably, when the operation c) has been completed, the AFX type zeolite membrane may be in direct contact with the support.

Preferably, the FAU type seed crystal may be a Y- or X-type zeolite.

Preferably, in the operation b), the FAU type seed crystal may be deposited on a generally vertical face or a downward face, out of a surface of the support, during production of the zeolite membrane composite.

A zeolite membrane composite according to another preferable embodiment of the present invention is produced by the above-described process for producing a zeolite membrane composite.

These and other objects, features, aspects and advantages of the present invention will become more apparent from the following detailed description of the present invention when taken in conjunction with the accompanying drawings.

DESCRIPTION OF EMBODIMENTS

Figure 1:
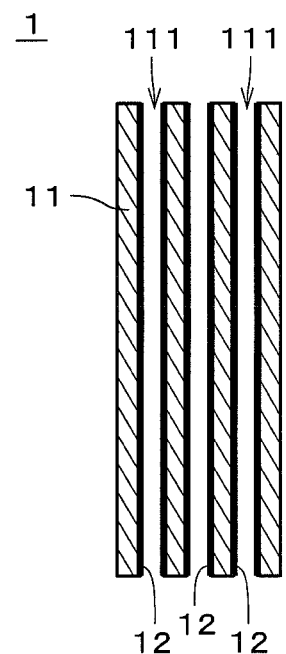
FIG. 1 is a sectional view of a zeolite membrane composite according to a first embodiment.
Figure 2:
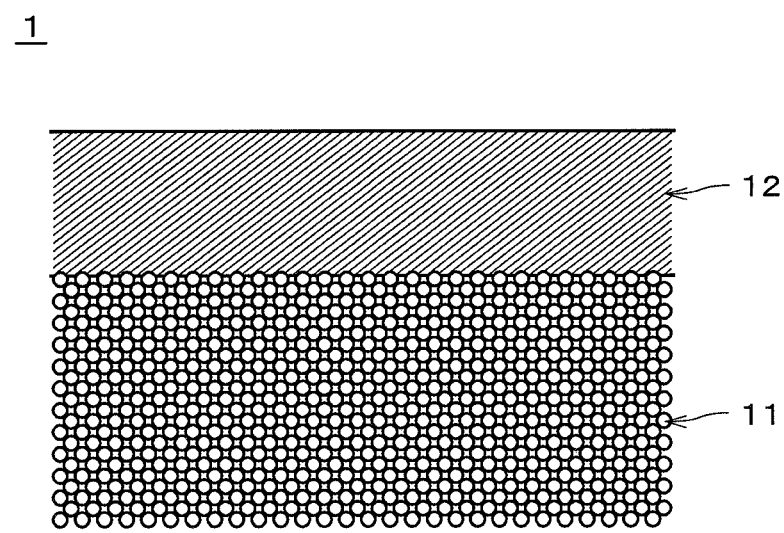
FIG. 2 is an enlarged sectional view of the zeolite membrane composite.

FIG. 1 is a sectional view of a zeolite membrane composite 1 according to a first embodiment of the present invention. FIG. 2 is an enlarged sectional view of part of the zeolite membrane composite 1. The zeolite membrane composite 1 includes a support 11 and a zeolite membrane 12 formed on the support 11. In the example illustrated in FIG. 1, the support 11 is a generally cylindrical monolith support having a plurality of through holes 111, each extending in a longitudinal direction (i.e., up-down direction in FIG. 1). For example, each through hole 111 (i.e., cell) is generally circular in cross section perpendicular to the longitudinal direction. In the illustration of FIG. 1, the diameter of the through holes 111 is greater than the actual diameter, and the number of through holes 111 is smaller than the actual number. The zeolite membrane 12 is formed on the inner side faces of the through holes 111 and covers approximately the entire inner side faces of the through holes 111. In the illustration of FIG. 1, the zeolite membrane 12 is indicated by thick lines. The support 11 may have any other shape such as a honeycomb shape, a flat plate shape, a tubular shape, a circular cylindrical shape, a cylindrical shape, or a prismatic shape.

In the present embodiment, the support 11 is a porous support capable of transmitting gases, and the zeolite membrane 12 is a gas separator membrane. The zeolite membrane 12 may be used in other applications as a molecular separation membrane using a molecular-sieving function. For example, the zeolite membrane 12 is also usable as a pervaporation membrane. The zeolite membrane composite 1 may be used in yet other applications. The support 11 may be impermeable to gases (e.g., non-porous support).

Any of various materials can be used as the material for the support 11 as long as the material has chemical stability in the step of forming the zeolite membrane 12 on the surface. Examples of the material for the support 11 include sintered ceramic compacts, metals, high polymeric organic substances, glass, and carbon. Examples of the sintered ceramic compacts include alumina, silica, mullite, zirconia, titania, yttrium, silicon nitride, and silicon carbide. Examples of the metals include aluminum, iron, bronze, and stainless steel. Examples of the high polymeric organic substances include polyethylene, polytetrafluoroethylene, polysulfone, and polyimide.

The support 11 may contain an inorganic binding material. As the inorganic binding material, at least one of the following may be used: titania, mullite, easily sinterable alumina, silica, glass frit, clay minerals, and easily sinterable cordierite.

When the zeolite membrane 12 is used as a gas separator membrane, the mean pore diameter in a portion of the support 11 that is in the vicinity of the surface, on which the zeolite membrane 12 is formed, is preferably smaller than the mean pore diameter in the other portion. To realize this structure, the support 11 has a multi-layer structure. When the support 11 has a multi-layer structure, the material for each layer may be any of the materials described above, and each layer may be made of the same material or may be made of a different material. The mean pore diameter can be measured with a device such as a mercury porosimeter, a perm porometer, or a nano-perm porometer. The mean pore diameter in the vicinity of the surface of the support 11 is preferably in the range of 0.001 μm to 1 μm, and the porosity is preferably in the range of 20% to 60%. This structure is preferably provided within a range of 1 μm to 50 μm from the surface.

The thickness of the zeolite membrane 12 is preferably in the range of 0.1 μm to 10 μm. Increasing the thickness of the zeolite membrane 12 improves gas separation performance. Reducing the thickness of the zeolite membrane 12 increases the gas transmission rate. The zeolite membrane 12 is in direct contact with the support 11. Specifically, the zeolite membrane 12 is in direct contact with the inner side faces of the through holes 111. In the example illustrated in FIG. 1, there are no other zeolites between the zeolite membrane 12 and the support 11, and the zeolite membrane 12 is in direct contact with approximately the entire inner side faces of the through holes 111.

The zeolite membrane 12 is a zeolite having an AFX-type structure. In other words, the zeolite membrane 12 is a zeolite with the framework type code AFX assigned by the International Zeolite Association. The zeolite membrane 12 contains two or more of silicon (Si), aluminum (Al), and phosphorus (P). In the present embodiment, the zeolite membrane 12 is an aluminosilicate zeolite that contains at least Al, Si, and oxygen (O). As described previously, various materials can be used as the material for the support 11. When the zeolite membrane 12 is an aluminosilicate zeolite, the support 11 is preferably a sintered alumina compact, a sintered mullite compact, or a sintered titania compact. For example, the support 11 may have a structure obtained by forming a titania layer on a sintered alumina compact.

Figure 3:
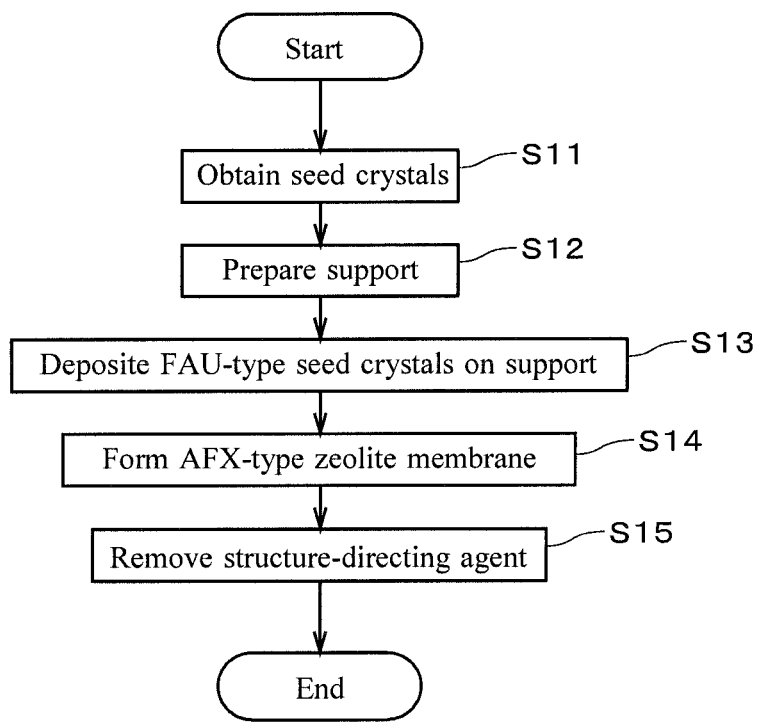
FIG. 3 illustrates a flow of production of the zeolite membrane composite.

FIG. 3 illustrates an exemplary flow of production of the zeolite membrane composite 1. First, FAU-type seed crystals are obtained from FAU-type zeolite powder (step S11). In other words, the seed crystals are a zeolite with the framework type code FAU assigned by the International Zeolite Association. The FAU-type seed crystals obtained in step S11 are preferably a Y- or X-type zeolite. More preferably, the seed crystals are a Y-type zeolite. The aforementioned FAU-type zeolite powder may be generated by hydrothermal synthesis. Alternatively, commercial FAU-type zeolite powder may be used as-is as the aforementioned FAU-type zeolite powder.

The seed crystals contain two or more of Si, Al, and P. In the present embodiment, the seed crystals are an aluminosilicate zeolite that contains at least Al, Si, and O. The proportion (i.e., composition ratio) of Si in the FAU-type seed crystals is preferably greater than or equal to one times and less than or equal to 250 times the proportion of Al in the FAU-type seed crystals, and more preferably greater than or equal to 1.6 times and less than or equal to 100 times the proportion of Al in the FAU-type seed crystals.

In step S11, the zeolite powder may be used as-is as seed crystals, or the seed crystals may be obtained by processing the zeolite powder, e.g., by pulverization.

Then, the support 11 is prepared (step S12). The support 11 is immersed in a solution in which the seed crystals have been dispersed, so that the FAU-type seed crystals are deposited on the support 11 (step S13). In step S13, for example, the support 11 is immersed in the solution while its longitudinal direction is approximately parallel to the direction of gravity. That is, the inner side face of each through hole 111 is a generally vertical face that is approximately parallel to the direction of gravity (i.e., a face whose normal is facing substantially in the horizontal direction). Each through hole 111 is filled with the aforementioned solution in which the seed crystals have been dispersed. Then, the solution in each through hole 111 is drawn by suction via the support 11 from the outer side face of the support 11 and drained out of the support 11. The seed crystals contained in the solution are accumulated and deposited on the inner side face of each through hole 111 without passing through the support 11. In this way, a seed-crystal-deposited support is produced. Note that other techniques may be used to deposit the seed crystals on the support 11.

The support 11 on which seed crystals have been deposited in step S13 (i.e., seed-crystal-deposited support) is immersed in a raw material solution. Then, the AFX-type zeolite membrane 12 is formed on the support 11 by growing an AFX-type zeolite by hydrothermal synthesis, using the FAU-type seed crystals as nuclei (step S14). The temperature at the time of the hydrothermal synthesis is preferably in the range of 110 to 200° C. The raw material solution is prepared by mixing, for example, an Si source and a structure-directing agent (hereinafter, also referred to as an "SDA"). The raw material solution may not contain an Al source, but an Al source may be added as necessary to the raw material solution. At this time, the dense zeolite membrane 12 can be obtained by adjusting, for example, the compounding ratio of the silicon source and the SDA in the raw material solution.

When step S14 has been completed, the AFX-type zeolite membrane 12 is in direct contact with the support 11. There are no other zeolites between the AFX-type zeolite membrane 12 and the support 11. Note that the FAU-type seed crystals may remain partly between the AFX-type zeolite membrane 12 and the support 11. After the completion of step S14, the SDA in the zeolite membrane 12 is decomposed and removed by heating (step S15).

Next, an example and comparative examples of the production of the zeolite membrane composite 1 will be described.

Example 1

First, the monolith support 11 was immersed in a solution in which Y-type zeolite crystals had been dispersed as seed crystals, so that the Y-type seed crystals were deposited on the inner side face of each through hole 111 in the support 11. The particle diameter of the Y-type seed crystals was, for example, in the range of 200 nm to 300 nm in terms of median diameter. For example, the thicknesses of the seed crystals deposited on the support 11 were approximately 1 μm. Also, a raw material solution with a composition of $23SiO_2:10Na_2O:2.8SDA:1000H_2O$ was prepared by dissolving colloidal silica, sodium hydroxide, and 1,4-diazabicyclo [2.2.2]octane-C4-diquat dibromide serving as a structure-directing agent (SDA) in deionized water.

Then, the support 11 on which the seed crystals had been deposited was immersed in this raw material solution, and hydrothermal synthesis was conducted at 170° C. for 50 hours. In this way, the AFX-type zeolite membrane 12 was formed on the support 11. After the hydrothermal synthesis, the support 11 and the zeolite membrane 12 were sufficiently cleaned with deionized water and then dried at 100° C. As a result of X-ray diffractometry, the obtained zeolite membrane 12 was an AFX-type zeolite. For example, the thickness of the zeolite membrane 12 was approximately 2 μm.

After the support 11 and the zeolite membrane 12 were dried, the amount of $N_2$ transmission in the zeolite membrane 12 was measured. The amount of $N_2$ transmission in the zeolite membrane 12 was less than or equal to 0.005 nmol/m²·s·Pa. This confirmed that the zeolite membrane 12 had practical levels of denseness. Thereafter, the zeolite membrane 12 was heat treated at 500° C. for 20 hours so as to burn and remove the SDA and penetrate micropores in the zeolite membrane 12.

Figure 4:
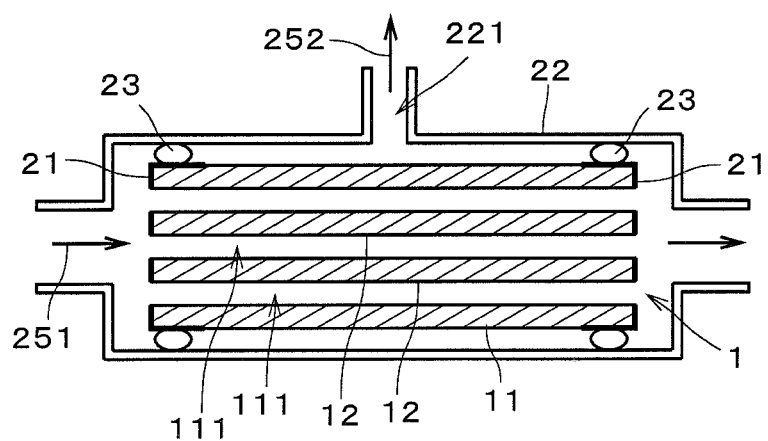
FIG. 4 illustrates a device for separating a gas mixture.

Then, a gas mixture separation test was conducted using a device having a schematic structure illustrated in FIG. 4. As described above, the zeolite membrane 12 was formed on the inner side faces of the plurality of through holes 111 in the support 11. Both ends of the support 11 were sealed with glass 21, and the support 11 was housed in an external cylinder 22. That is, the zeolite membrane composite 1 was provided within the external cylinder 22. Moreover, a sealing member 23 was provided between the external cylinder 22 and both end parts of the support 11. Under this condition, a gas mixture was introduced into each through hole 111 of the support 11 as indicated by an arrow 251, and the gas passing through the zeolite membrane 12 was collected through a hole 221 provided in the external cylinder 22 as indicated by an arrow 252.

The gas feed pressure in the separation test was 0.2 MPaG. As the aforementioned gas mixture, a gas mixture with a $CO_2/CH_4$ ratio of 50:50 was used. As a result, the $CO_2/CH_4$ permeance ratio of the zeolite membrane 12 was 50. This confirmed that the zeolite membrane 12 had sufficiently practical levels of separation performance.

Comparative Example 1

First, a raw material solution with a composition of $23SiO_2:1Al_2O_3:10Na_2O:2.8SDA:1000H_2O$ was produced by dissolving colloidal silica, Y-type zeolite crystals, sodium hydroxide, and 1,4-diazabicyclo [2.2.2]octane-C4-diquat dibromide serving as a structure-directing agent (SDA) in deionized water.

Then, a support similar to the support 11 in Example 1 was immersed in this raw material solution, and hydrothermal synthesis was conducted at 170° C. for 50 hours. In Comparative Example 1, unlike in Example 1, seed crystals were not deposited on the support immersed in the raw material solution. By the hydrothermal synthesis, an AFX-type zeolite was formed partly on the support, but a dense zeolite membrane that covers the entire inner side faces of the through holes in the support was not formed.

Comparative Example 2

First, a support similar to the support 11 in Example 1 was immersed in a solution in which AFX-type zeolite crystals had been dispersed as seed crystals, so that the AFX type seed crystals were deposited on the inner side face of each through hole of the support. The support was then immersed in a raw material solution similar to that in Comparative Example 1, and hydrothermal synthesis was conducted at 170° C. for 50 hours. By the hydrothermal synthesis, an AFX-type zeolite was formed partly on the support, but a dense zeolite membrane that covers the entire inner side faces of through holes in the support was not formed.

As described above, the zeolite membrane composite 1 includes the support 11 and the AFX-type zeolite membrane 12 formed on the support 11. Thus, the zeolite membrane composite 1 can provide the AFX-type zeolite membrane 12.

As described above, the support 11 is porous. Thus, in the zeolite membrane composite 1, the zeolite membrane 12 can be used as an separator membrane (e.g., gas separator membrane). The support 11 is a sintered alumina compact, a sintered mullite compact, or a sintered titania compact.

Thus, it is possible to improve the adhesion of the seed crystals, which are FAU-type zeolite crystals, to the support 11.

The process for producing the zeolite membrane composite 1 includes the step of obtaining FAU-type seed crystals (step S11), the step of depositing the FAU-type seed crystals on the support 11 (step S13), the step of forming the AFX-type zeolite membrane 12 on the support 11 by immersing the support 11 in a raw material solution and growing an AFX-type zeolite from the FAU-type seed crystals by hydrothermal synthesis (step S14), and the step of removing the structure-directing agent from the AFX-type zeolite membrane 12 (step S15). This process can provide the AFX-type zeolite membrane 12.

As described above, the FAU-type seed crystals are a Y- or X-type zeolite. This enables efficient formation of the AFX-type zeolite membrane 12 in step S14. The FAU-type seed crystals are more preferably a Y-type zeolite. This further improves the efficiency of forming the AFX-type zeolite membrane 12 in step S14.

In the process for producing the zeolite membrane composite 1, unlike in Comparative Example 1, the dense AFX-type zeolite membrane 12 can be formed on the support 11 by depositing the FAU-type seed crystals on the support 11 in step S13. Thus, this production process is especially suited for the formation of the zeolite membrane 12 on faces on which crystals are not easily deposited due to the influence of gravity, out of the surface of the support 11. In other words, this production process is especially suited for cases where the FAU-type seed crystals are deposited on generally vertical faces or downward faces out of the surface of the support 11 in step S13 during the production of the zeolite membrane composite 1. With this production process, the dense and uniform zeolite membrane 12 can be formed even on generally vertical faces or downward faces during the production of the zeolite membrane composite 1. The aforementioned downward faces refer to faces whose normals are facing downward from a horizontal plane, and they include both of those whose normals are facing vertically downward and those whose normals are facing diagonally downward. Of course, the seed crystals may be deposited on any face that is facing in any direction, including upward faces, as long as the face is the surface of the support 11.

Figure 5:
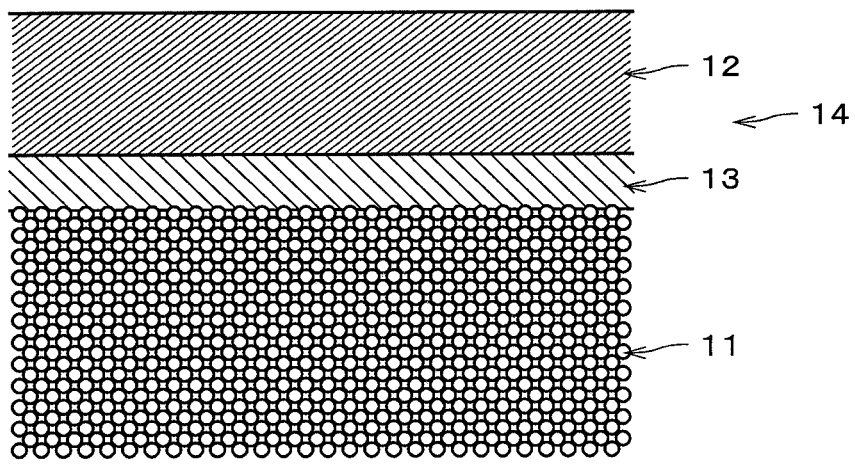
FIG. 5 is an enlarged sectional view of a zeolite membrane composite according to a second embodiment.

Next, a zeolite membrane composite 1a according to a second embodiment of the present invention will be described. FIG. 5 is an enlarged sectional view of part of the zeolite membrane composite 1a. The zeolite membrane composite 1a further includes an FAU-type zeolite membrane 13, in addition to the support 11 and the AFX-type zeolite membrane 12 illustrated in FIG. 1. The zeolite membrane composite 1a and the zeolite membrane composite 1 illustrated in FIG. 1 are similar in the other structure such as the shape of the support 11, and similar components are given the same reference signs in the following description.

The FAU-type zeolite membrane 13 is located between the support 11 and the AFX-type zeolite membrane 12. The FAU-type zeolite membrane 13 is preferably a Y- or X-type zeolite membrane. More preferably, the FAU-type zeolite membrane 13 is a Y-type zeolite membrane. A total thickness of the zeolite membranes 12 and 13 is preferably in the range of 0.1 μm to 10 μm. For example, the proportion of the thickness of the zeolite membrane 12 is greater than or equal to one times and less than or equal to 100 times the proportion of the thickness of the zeolite membrane 13. Increasing the proportion of the zeolite membrane 12 improves gas separation performance. Reducing the proportion of the zeolite membrane 12 increases the gas transmission rate.

The FAU-type zeolite membrane 13 is in direct contact with the support 11. In other words, the zeolite membrane 13 is in direct contact with the inner side faces of the through holes 111 (see FIG. 1). In the example illustrated in FIG. 5, there are no other zeolites between the zeolite membrane 13 and the support 11, and the zeolite membrane 13 is in direct contact with approximately the entire inner side faces of the through holes 111. The AFX-type zeolite membrane 12 covers approximately the entire inner side faces of the through holes 111. However, the zeolite membrane 12 is not in direct contact with the support 11, and the zeolite membrane 12 is in direct contact with approximately the entire surface of the FAU-type zeolite membrane 13. That is, the AFX-type zeolite membrane 12 illustrated in FIG. 5 is in indirect contact with the support 11 via the FAU-type zeolite membrane 13.

In the zeolite membrane composite 1a, the FAU-type zeolite membrane 13 does not necessarily have to cover approximately the entire inner side faces of the through holes 111, and may cover part of the inner side faces of the through holes 111. In other words, the FAU-type zeolite membrane 13 is present partly on the inner side faces of the through holes 111. In this case, in the area where the FAU-type zeolite membrane 13 is present, the AFX-type zeolite membrane 12 is in direct contact with the FAU-type zeolite membrane 13 and is not in direct contact with the support 11. In the area where the FAU-type zeolite membrane 13 is not present, the AFX-type zeolite membrane 12 is in direct contact with the support 11.

Figure 6:
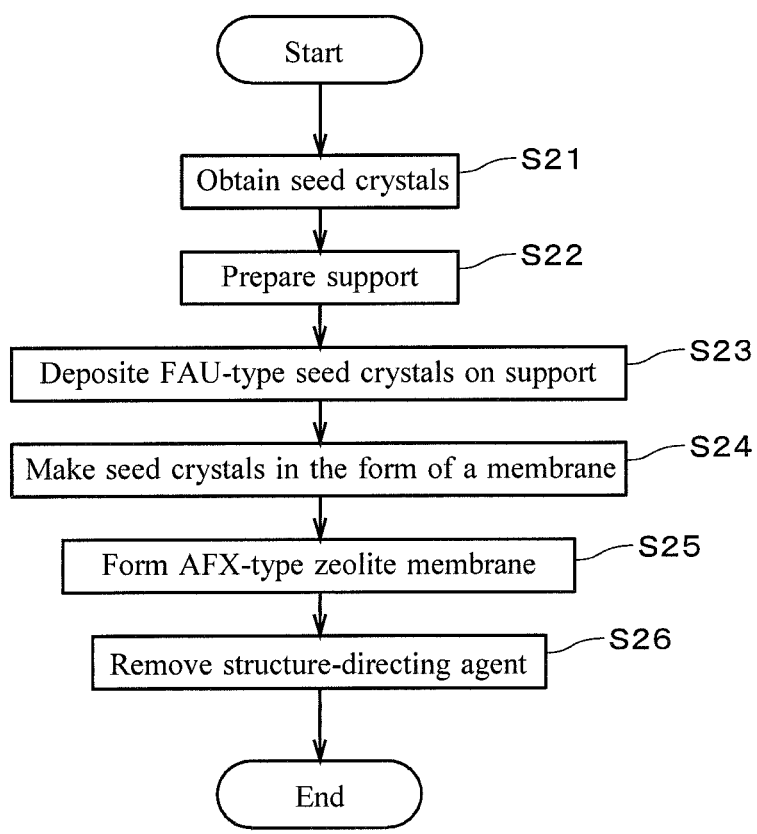
FIG. 6 illustrates a flow of production of the zeolite membrane composite.

FIG. 6 illustrates an exemplary flow of production of the zeolite membrane composite 1a. Steps S21 to S23 are approximately similar to steps S11 to S13 (see FIG. 3) in the production of the zeolite membrane composite 1, and steps S25 and S26 are approximately similar to steps S14 and S15. In the production of the zeolite membrane composite 1a, step S24 which will be described later is performed between steps S23 and S25, which correspond to steps S13 and S14.

Specifically, first, FAU-type seed crystals are obtained from FAU-type zeolite powder (step S21). The FAU-type seed crystals obtained in step S21 are preferably a Y- or X-type zeolite. More preferably, the seed crystals are a Y-type zeolite. The aforementioned FAU-type zeolite powder may be generated by hydrothermal synthesis. Alternatively, commercial FAU-type zeolite powder may be used as-is as the aforementioned FAU-type zeolite powder.

Then, the support 11 is prepared (step S22). The support 11 is immersed in a solution in which the seed crystals have been dispersed, so that the FAU-type seed crystals are deposited on the support 11 (step S23). In step S23, the support 11 is immersed in the solution while its longitudinal direction is approximately parallel to the direction of gravity. That is, the inner side face of each through hole 111 is a generally vertical face that is approximately parallel to the direction of gravity (i.e., face whose normal is facing substantially in the horizontal direction). Each through hole 111 is filled with the aforementioned solution in which the seed crystals have been dispersed. Then, the solution in each through hole 111 is drawn by suction via the support 11 from the outer side face of the support 11 and drained out of the support 11. The seed crystals contained in the solution are accumulated and deposited on the inner side face of each through hole 111 without passing through the support 11. In this way, a seed-crystal-deposited support is produced. Note that other techniques may be used to deposit the seed crystals on the support 11.

The support 11 on which the seed crystals have been deposited in step S23 (i.e., seed-crystal-deposited support) is immersed in a raw material solution. Then, the FAU-type seed crystals are made in the form of a membrane by hydrothermal synthesis so as to form the FAU-type zeolite membrane 13 (step S24). In other words, the zeolite membrane 13 corresponds to the FAU-type seed crystals made in the form of a membrane. The FAU-type zeolite membrane 13 covers approximately the entire inner side faces of the through holes 111 in the support 11. The thickness of the FAU-type zeolite membrane 13 formed in step S24 is, for example, in the range of 1 to 10 μm.

The temperature at the time of the hydrothermal synthesis is preferably in the range of 80 to 120° C. The raw material solution is prepared by mixing, for example, a silicon source and an aluminum source. When step S24 has been completed, the FAU-type zeolite membrane 13 is in direct contact with the support 11. There are no other zeolites between the FAU-type zeolite membrane 13 and the support 11. Note that the FAU-type seed crystals may remain partly between the FAU-type zeolite membrane 13 and the support 11.

The support 11 having a surface on which the FAU-type zeolite membrane 13 has been formed in step S24 is immersed in a raw material solution. Then, the AFX-type zeolite membrane 12 is formed on the FAU-type zeolite membrane 13 by growing an AFX-type zeolite by hydrothermal synthesis, using the FAU-type zeolite membrane 13 (i.e., FAU-type seed crystals made in the form of a membrane) as nuclei (step S25). The AFX-type zeolite membrane 12 covers approximately the entire inner side faces of the through holes 111 in the support 11. The temperature at the time of the hydrothermal synthesis is preferably in the range of 110 to 200° C. The raw material solution is prepared by mixing, for example, an Si source and an SDA. The raw material solution may not contain an Al source, but an Al source may be added as necessary to the raw material solution. At this time, the dense zeolite membrane 12 can be obtained by adjusting, for example, the compounding ratio of the Si source and the SDA in the raw material solution.

When step S25 has been completed, the FAU-type zeolite membrane 13 is present between the support 11 and the AFX-type zeolite membrane 12. The AFX-type zeolite membrane 12 is in direct contact with the FAU-type zeolite membrane 13. As in the case where step S24 has been completed, the FAU-type zeolite membrane 13 is in direct contact with approximately the entire inner side faces of the through holes 111 in the support 11.

The thickness of the AFX-type zeolite membrane 12 formed in step S25 is, for example, in the range of 0.1 to 10 μm. By forming the AFX-type zeolite membrane 12 in step S25, the thickness of the FAU-type zeolite membrane 13 is reduced. In other words, the thickness of the zeolite membrane 13 after completion of step S25 is smaller than the thickness of the zeolite membrane 13 after completion of step S24 and before start of step S25. The thickness of the FAU-type zeolite membrane 13 after completion of step S25 is, for example, in the range of 0.05 to 9.95 is m. The Si/Al ratio in the FAU-type zeolite membrane 13 after completion of step S25 is approximately the same as the Si/Al ratio in the FAU-type zeolite membrane 13 after completion of step S24 and before start of step S25. After completion of step S25, the SDA in the zeolite membrane 12 is decomposed and removed by heating (step S26).

In the production of the zeolite membrane composite 1a, as a result of the reduction of the FAU-type zeolite membrane 13 in step S25, the inner side faces of the through holes 111 in the support 11 may be exposed partly from the FAU-type zeolite membrane 13. In this case, out of the inner side faces of the through holes 111 in the support 11, portions that are exposed from the FAU-type zeolite membrane 13 are in direct contact with the AFX-type zeolite membrane 12.

In step S25, approximately the entire FAU-type zeolite membrane 13 may disappear after used to form the AFX-type zeolite membrane 12. In this case, approximately the entire inner side faces of the through holes 111 are in direct contact with the AFX-type zeolite membrane 12, and the zeolite membrane composite 1a has a similar structure to that of the zeolite membrane composite 1 illustrated in FIGS. 1 and 2.

Next, an example of the production of the zeolite membrane composite 1a will be described.

Example 2

First, as in Example 1, the monolith support 11 was immersed in a solution in which Y-type zeolite crystals had been dispersed as seed crystals, so that the Y-type seed crystals were deposited on the inner side face of each through hole 111 in the support 11. For example, the particle diameter of the Y-type seed crystals was in the range of 200 nm to 300 nm in terms of median diameter. The thicknesses of the seed crystals deposited on the support 11 were, for example, approximately 1 μm. Also, a raw material solution with a composition of $23SiO_2:1Al_2O_3:22Na_2O:1000H_2O$ was produced by dissolving colloidal silica, sodium aluminate, and sodium hydroxide in deionized water.

Then, the support 11 on which the seed crystals had been deposited was immersed in that raw material solution, and hydrothermal synthesis was conducted at 100° C. for 10 hours. In this way, the FAU-type zeolite membrane 13 was formed on the support 11. After the hydrothermal synthesis, the support 11 and the zeolite membrane 13 were sufficiently cleaned with deionized water and then dried at 100° C. As a result of X-ray diffractometry, the obtained zeolite membrane 13 was a Y-type zeolite. The thickness of the zeolite membrane 13 was, for example, approximately 2.0 μm.

Next, a raw material solution with a composition of $23SiO_2:10Na_2O:2.8SDA:1000H_2O$ was produced by dissolving colloidal silica, sodium hydroxide, and 1,4-diazabicyclo [2.2.2]octane-C4-diquat dibromide serving as a structure-directing agent (SDA) in deionized water. Then, the support 11 having a surface on which the Y-type zeolite membrane 13 had been formed was immersed in that raw material solution, and hydrothermal synthesis was conducted at 170° C. for 10 hours. In this way, the AFX-type zeolite membrane 12 was formed on the support 11 and on the Y-type zeolite membrane 13. After the hydrothermal synthesis, the support 11, the zeolite membrane 13, and the zeolite membrane 12 were sufficiently cleaned with deionized water and dried at 100° C. As a result of X-ray diffractometry, the obtained zeolite membrane 12 was an AFX-type zeolite. The thickness of the AFX-type zeolite membrane was, for example, approximately 2 μm. The thickness of the Y-type zeolite membrane 13 after the formation of the zeolite membrane 12 was, for example, approximately 1.0 μm.

After the support 11, the zeolite membrane 13, and the zeolite membrane 12 had been dried, the amount of $N_2$ transmission in the zeolite membranes 12 and 13 (which are hereinafter also collectively referred to as a "stacked zeolite membrane 14") was measured. The amount of $N_2$ transmission in the stacked zeolite membrane 14 was less than or equal to 0.005 nmol/m²·s·Pa. This confirmed that the stacked zeolite membrane 14 had practical levels of denseness. Thereafter, the zeolite membrane 12 was heat treated at 500° C. for 20 hours so as to burn and remove the SDA and penetrate micropores in the zeolite membrane 12.

Next, as in Example 1, a mixture gas separation test was conducted using a device having a schematic structure illustrated in FIG. 4. As described above, the stacked zeolite membrane 14 was formed on the inner side faces of the plurality of through holes 111 in the support 11. The gas feed pressure in the separation test was 0.2 MPaG. As the aforementioned gas mixture, a gas mixture with a $CO_2/CH_4$ ratio of 50:50 was used. As a result, the $CO_2/CH_4$ permeance ratio of the zeolite membrane 12 was 62. This confirmed that the stacked zeolite membrane 14 had sufficiently practical levels of separation performance.

As described above, like the zeolite membrane composite 1 illustrated in FIG. 1, the zeolite membrane composite 1a includes the support 11 and the AFX-type zeolite membrane 12 formed on the support 11. Thus, the zeolite membrane composite 1a can also provide the AFX-type zeolite membrane 12.

As described above, the zeolite membrane composite 1a further includes the FAU-type zeolite membrane 13 located between the support 11 and the AFX-type zeolite membrane 12. In the zeolite membrane composite 1a, the AFX-type zeolite membrane 12 can be formed with precision in shape by forming the AFX-type zeolite membrane 12 on the FAU-type zeolite (i.e., zeolite membrane 13) made in the form of a relatively dense and uniform membrane.

In the zeolite membrane composite 1 illustrated in FIGS. 1 and 2, on the other hand, the AFX-type zeolite membrane 12 is in direct contact with the support 11. That is, there are no other zeolites between the AFX-type zeolite membrane 12 and the support 11. This simplifies the formation of the AFX-type zeolite membrane 12.

In the zeolite membrane composite 1a, the FAU-type zeolite membrane 13 is a Y- or X-type zeolite. Thus, the AFX-type zeolite membrane 12 can be formed efficiently in step S25. The FAU-type zeolite membrane 13 is more preferably a Y-type zeolite. This further improves the efficiency of forming the AFX-type zeolite membrane 12 in step S25.

As described above, the support 11 is porous. Thus, in the zeolite membrane composite 1a, the AFX-type zeolite membrane 12 (or the stacked zeolite membrane 14 when the FAU-type zeolite membrane 13 remains) can be used as a separator membrane such as a gas separator membrane. The support 11 is a sintered alumina compact, a sintered mullite compact, or a sintered titania compact. This improves the adhesion of the seed crystals, which are the FAU-type zeolite crystals, to the support 11.

As in the case of the zeolite membrane composite 1, the process for producing the zeolite membrane composite 1a includes the step of generating an FAU-type zeolite by hydrothermal synthesis to obtain FAU-type seed crystals (step S21), the step of depositing the FAU-type seed crystals on the support 11 (step S23), the step of forming the AFX-type zeolite membrane 12 on the support 11 by immersing the support 11 in the raw material solution and growing an AFX-type zeolite from the FAU-type seed crystals by hydrothermal synthesis (step S25), and the step of removing the structure-directing agent from the AFX-type zeolite membrane 12 (step S26). In this way, the AFX-type zeolite membrane 12 can be provided.

As described above, the process for producing the zeolite membrane composite 1a further includes the step of, between steps S23 and S25, making the FAU-type seed crystals on the support 11 in the form of a membrane by hydrothermal synthesis (step S24). Step S24 improves uniformity in the arrangement of the seed crystals on the support 11. Accordingly, the AFX-type zeolite membrane 12 can be formed with precision in shape by forming the AFX-type zeolite membrane 12 from the FAU-type seed crystals (i.e., zeolite membrane 13) made in the form of a membrane.

When step S25 has been completed, the FAU-type zeolite membrane 13 is present between the support 11 and the AFX-type zeolite membrane 12. In this case, in step S25, the AFX-type zeolite membrane 12 can grow while its face on the side opposite to the frontside is always in contact with the FAU-type zeolite membrane 13. Thus, the AFX-type zeolite membrane 12 can be formed with higher precision in shape.

In the production of the zeolite membrane composite 1 illustrated in FIGS. 1 and 2, on the other hand, the FAU-type seed crystals deposited on the support 11 are not made in the form of a membrane, and when step S14 has been completed, the AFX-type zeolite membrane 12 is in direct contact with the support 11. This simplifies the formation of the AFX-type zeolite membrane 12.

As described above, the FAU-type seed crystals and the zeolite membrane 13 are a Y- or X-type zeolite. Thus, the AFX-type zeolite membrane 12 can be formed efficiently in step S25. More preferably, the FAU-type seed crystals and the zeolite membrane 13 are a Y-type zeolite. This further improves the efficiency of forming the AFX-type zeolite membrane 12 in step S25.

In the process for producing the zeolite membrane composite 1a, unlike in Comparative Example 1 described above, the dense AFX-type zeolite membrane 12 can be formed on the support 11 by depositing the FAU-type seed crystals on the support 11 in step S23. Therefore, this production process is especially suited for the formation of the zeolite membrane 12 on faces on which crystals are not easily deposited due to the influence of gravity, out of the surface of the support 11. In other words, this production process is especially suited for cases where the FAU-type seed crystals are deposited on generally vertical faces or downward faces out of the surface of the support 11 in step S23 during the production of the zeolite membrane composite 1a. With this production process, the dense and uniform zeolite membrane 12 can be formed even on generally vertical faces or downward faces during the production of the zeolite membrane composite 1a. Note that the seed crystals may be deposited on any face that is facing in any direction, including upward faces, as long as the face is the surface of the support 11.

The above-described zeolite membrane composites 1 and 1a and processes for producing the same can be modified in various ways.

The seed crystals, which are FAU-type zeolite crystals, may be zeolite crystals other than Y- and X-type zeolite crystals. In the zeolite membrane composite 1a illustrated in FIG. 5, the FAU-type zeolite membrane 13 may be any zeolite membrane other than Y- and X-type zeolite membranes.

For example, the raw material solution used in Examples 1 and 2 may contain FAU-type zeolite crystals. In this case, the FAU-type zeolite crystals are preferably Y- or X-type zeolite crystals, and more preferably Y-type zeolite crystals.

The seed crystals, the zeolite membrane 13, and the zeolite membrane 12 do not necessarily have to be made of pure aluminosilicate, and may contain other elements. For example, the seed crystals, the zeolite membrane 13, and the zeolite membrane 12 may contain alkali metals or alkaline-earth metals. The seed crystals, the zeolite membrane 13, and the zeolite membrane 12 may further contain cobalt (Co) atoms or P atoms. For example, the seed crystals, the zeolite membrane 13, and the zeolite membrane 12 may be a silico-aluminophosphate (SAPO) zeolite composed of Si, Al, P, and O atoms. The seed crystals, the zeolite membrane 13, and the zeolite membrane 12 do not necessarily have to contain all of Al, Si, and O. Moreover, the seed crystals, the zeolite membrane 13, and the zeolite membrane 12 do not necessarily have to contain at least two of Si, Al, and P.

The zeolite membrane composites 1 and 1a may further include a function membrane or a protective membrane that is stacked on the AFX-type zeolite membrane 12. Such a function or protective membrane is not limited to a zeolite membrane, and may be an inorganic membrane such as a carbon membrane or a silica membrane, or may be an organic membrane such as a polyimide membrane or a silicone membrane.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The zeolite membrane composite according to the present invention is usable as, for example, a gas separator membrane, and is also usable in various fields using zeolites as, for example, a separator membrane for substances other than gases or as an adsorption membrane for various substances.

REFERENCE SIGNS LIST 1, 1a Zeolite membrane composite
11 Support
12 AFX-type zeolite membrane
13 FAU-type zeolite membrane
S11 to S15, S21 to S26 Step

The invention claimed is:

1. A zeolite membrane composite comprising:
   a support;
   an FAU type zeolite membrane; and
   an AFX type zeolite membrane;
   wherein the FAU type zeolite membrane is located between the support and the AFX type zeolite membrane, and the AFX type zeolite membrane is formed on the FAU type zeolite membrane.

2. The zeolite membrane composite according to claim 1, wherein
   the AFX type zeolite membrane is a zeolite membrane made of aluminosilicate zeolite.

3. The zeolite membrane composite according to claim 1, wherein
   the AFX type zeolite membrane is in direct contact with the support.

4. The zeolite membrane composite according to claim 1, wherein the FAU type zeolite membrane is a Y- or X-type zeolite membrane.

5. The zeolite membrane composite according to claim 1, wherein the support is porous.

6. The zeolite membrane composite according to claim 1, wherein
   the support is a sintered alumina compact, a sintered mullite compact, or a sintered titania compact.

7. A process for producing a zeolite membrane composite, comprising:
   a) obtaining an FAU type seed crystal;
   b) depositing the FAU type seed crystal on a support;
   c) making the FAU type seed crystal on the support in the form of a membrane by hydrothermal synthesis;
   d) forming an AFX type zeolite membrane on the AFX type seed crystal membrane by immersing the support in a raw material solution and growing an AFX type zeolite from the FAU type seed crystal membrane by hydrothermal synthesis; and
   e) removing a structure-directing agent from the AFX type zeolite membrane.

8. The process for producing a zeolite membrane composite according to claim 7, wherein when the operation c) has been completed, the AFX type zeolite membrane is in direct contact with the support.

9. The process for producing a zeolite membrane composite according to claim 7, wherein the FAU type seed crystal is a Y- or X-type zeolite.

10. The process for producing a zeolite membrane composite according to claim 7,
    wherein in the operation b), the FAU type seed crystal is deposited on a surface of the support that faces a generally vertical direction or a downward direction during production of the zeolite membrane composite.

11. A zeolite membrane composite produced by the process for producing a zeolite membrane composite according to claim 7.

* * * * *